J. L. AXEN.
ELECTRIC METER.
APPLICATION FILED FEB. 13, 1917.
1,247,613.
Patented Nov. 27, 1917.
2 SHEETS—SHEET 1.
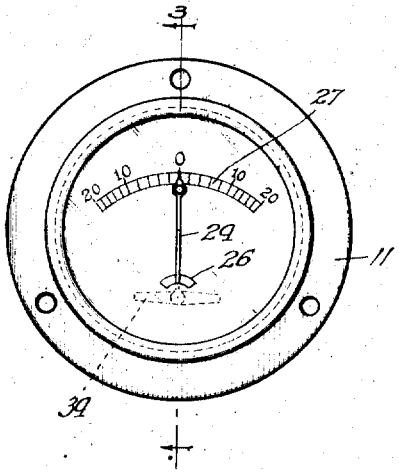
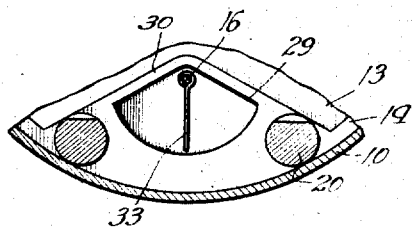
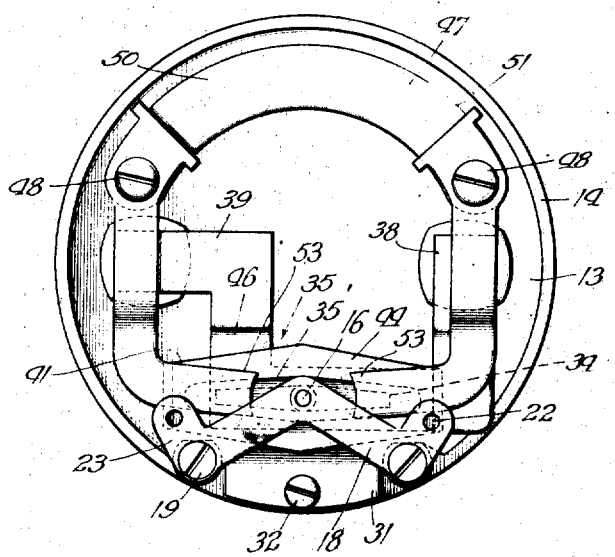
Witnesses:
Robert H. Weir
Arthur W. Carbon
Inventor:
John L. Axen
Foree Bain & Moy
Attys.

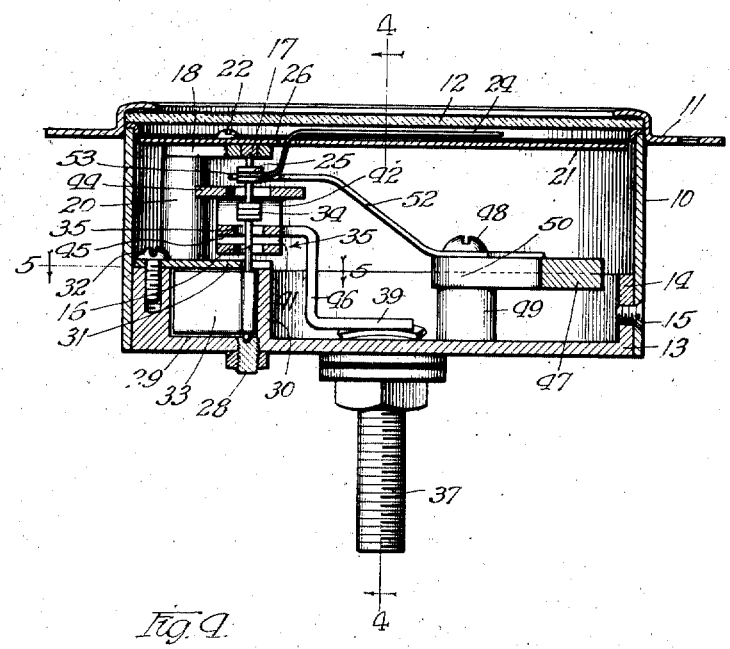
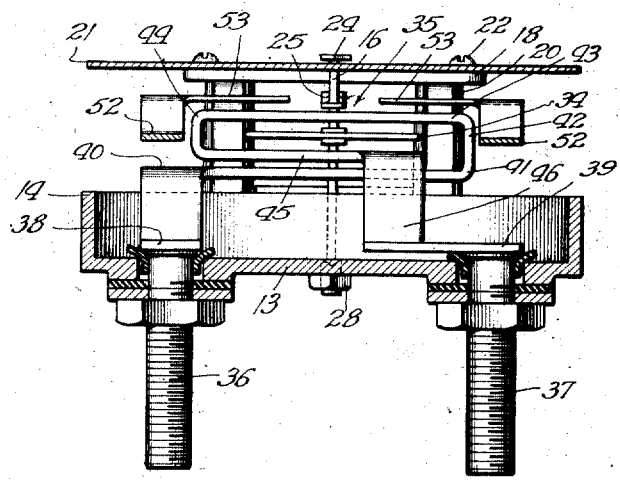

UNITED STATES PATENT OFFICE.

JOHN L. AXEN, OF DETROIT, MICHIGAN.

ELECTRIC METER.

1,247,613.  Specification of Letters Patent.  Patented Nov. 27, 1917.

Application filed February 13, 1917.  Serial No. 148,314.

*To all whom it may concern:*

Be it known that I, JOHN L. AXEN, a citizen of the United States, residing at Detroit, in the county of Wayne and State of Michigan, have invented certain new and useful Improvements in Electric Meters, of which the following is a specification.

My invention relates to electrical measuring instruments and has for its special object to provide a de-polarizable instrument so constructed that the anomalous magnetic polarity produced by an excessive flow of current, as when the instrument is in a short circuit, will not have any permanent effect or influence on the normal resident polarity of the inter-related parts.

Another object of my invention is to provide a simple, effective and permanent means for calibrating the instrument.

Other and further objects of my invention will become readily apparent to persons skilled in the art from a consideration of the following description when taken in conjunction with the drawings, wherein—

Figure 1 is a front elevation of the instrument.

Fig. 2 is an enlarged front elevation of the instrument with the dial removed.

Fig. 3 is a sectional view taken on line 3—3 of Fig. 1.

Fig. 4 is a sectional view taken on line 4—4 of Fig. 3 showing the instrument with the casing removed.

Fig. 5 is a sectional view taken on line 5—5 of Fig. 3.

In the accompanying illustrative embodiment of my invention I have shown an ammeter for measuring and indicating the direction of an electric current.

The instrument illustrated is of the polarity indicating type wherein the needle or index is normally poised in the center or zero point of the scale, to be deflected to one side or the other of the scale depending upon the direction of current flow, the amount of deflection in either direction indicating the amount of current passing through the instrument.

Instruments of this type, wherein the index needle is poised or inductively influenced by an adjacent permanent magnet have always heretofore been open to the danger of demagnetization of the permanent magnet or reversal of its polarity due to the magnetic effects produced by an abnormal current flowing through the instrument coil in excess of its intended capacity. The effect of such an occurrence is to destroy the stability and calibration of the instrument and to impair or minimize its usefulness.

In my improved construction I provide a permanent magnet to inductively influence or poise the needle but instead of placing it in close proximity to the current carrying coil, as is usual in instruments of this character, I have located it as far away therefrom as environments will permit, and beyond the effective reacting field that may be produced by an excessive current flowing through the coil. To each pole of the permanent magnet I attach relatively small thin or attenuated strips of cast iron or other permeable material, of low magnetic retentiveness, the strips possessing considerable magnetic reluctance owing to their length and relatively small cross section. The magnetic flux through these relatively thin long pole pieces is sufficient for the desired purpose but they interpose too much magnetic resistance, between the coil and the permanent magnet to permit sufficient flow of magnetism from the coil to the permanent magnet to de-magnetize the same or reverse its polarity.

Referring now to the specific embodiment of my invention which I have illustrated for the purpose of complete disclosure, the numeral 10 indicates a cup shaped casing having at its front a flange 11 for attachment to an instrument board, the opening in the flange 11 being overlain by a glass 12. Telescoping within the rear of the casing 10 is a cup shaped base member 13, the peripheral flange 14 of which is secured to the casing 10 by means of the screws 15. The instrument parts are all carried by the base 13 so that when removed from the casing all of the instrument parts are open for inspection or repair.

The movable parts of the indicator are carried on a staff 16 journaled at its upper end in a bearing 17 carried at the apex of a V-shaped bar 18, the outer ends of which are fastened by screws 19 to the vertical posts 20 cast integral with the base 13. The dial or face 21 of the instrument is secured by means of screws 22 to the wings 23 formed integral with the V-shaped bar 18. The needle or pointer 24 is secured as at 25 near the upper end of the staff beneath the dial and projects through a small arcuate opening 26 therein for presentation at the outer face of the dial, the pointer cooperating with the arcuate scale indicated at 27.

The lower end of the staff 16 sets in the adjustable bearing 28 carried in the bottom wall of the base 13 and lying at the apex of a fan shaped recess or air chamber 29 bounded by the walls 30 which extend to the peripheral wall 14 of the base. A cover plate 31 overlies the fan shaped recess and is secured in position by means of a screw 32. A blade or vane 33 is mounted upon the lower end portion of the staff 16 and is of a size but slightly less than the transverse area of the recess. This blade operating within the closed chamber serves as a dampener, rendering the instrument practically dead beat and insuring a steady, even reading.

A short diamond shaped armature 34 of magnetic material is mounted on the shaft between the cover plate 31 and the needle mounting 25 and is influenced by a current carrying coil which comprises a flat strip of metal indicated in general by the numeral 35. The coil terminals 36, 37, project through the rear wall of the base 13 and are secured at their inner ends to the opposite ends 38, 39 of the coil 35. As heretofore stated the coil comprises a flat strip of metal and extends from one end 38 upwardly as at 40 into a plane parallel with the armature 34 and below the same extending from one end 40 to a point 41 beyond the opposite side end of the needle, where it is bent upwardly as at 42 and then backwardly as at 43 parallel with the first leg but above the armature. At the opposite end of the leg 43 it is again bent downwardly, as at 44, and is returned upon itself as at 45 in a plane approximately midway between the armature and the lower course of the coil and then extends outwardly away from the coil as at 46 terminating as at 39 where it is connected to the terminal 37. The three layers of the coil are perforated as at 35' to permit the passage therethrough of the staff 16.

A short bar 47 of permanently magnetized metal is bent in an arc to conform to the curvature of the periphery of the base and is secured at its opposite ends by screws 48 upon the posts 49 cast integral with the bottom wall of the base. The magnet is mounted at the side of the base opposite to the armature 34 and coil 35 and is positioned just as close to the farthest edge of the instrument base as the environments will permit. From the poles 50, 51 of the magnet I have extended thin strips of cast iron or similar permeable material of low magnetic retentiveness, their ends being connected directly to the magnet 47 by means of the magnet mounting screws 48. These strips 52 extend from the poles of the magnet upwardly and away from the poles into a plane a short distance above the upper course 43 of the coil 35. The extreme ends 53 of the strips 52 are bent inwardly toward the shaft so as to lie above the armature 34 at opposite sides of the staff. The ends are flexible and may be bent upwardly or downwardly to vary their distance from the armature, thus providing a simple and efficient method of calibration.

Whereas I have illustrated and described a single embodiment of my invention it is obvious that various changes may be made therein without departing from the spirit and scope of the appended claims.

Having described my invention, what I claim is:—

1. An electric current indicator comprising a current carrying member, a member susceptible to magnetic influence associated therewith, said members being relatively movable, a permanent magnet positioned remote from the current carrying member, and relatively attenuate pole pieces extending from the poles of the magnet into the field of influence of said current carrying member and incapable of transmitting sufficient magnetic flux from said member to reverse the polarity of the magnet.

2. An electric current indicator comprising a movable member susceptible to magnetic influence, a current carrying conductor associated therewith, a permanent magnet positioned remote from the conductor, and metallic strips of small cross section extending from the poles of the magnet into close proximity to the movable member and incapable of transmitting sufficient magnetic flux from said conductor to reverse the polarity of the magnet.

3. An electric current indicator comprising a movable member of magnetic material, an electrical conductor associated therewith, a permanent magnet positioned remote from the coil, and metal pole pieces of low magnetic retentiveness extending from the poles of the magnet into close proximity to the movable member and incapable of transmitting sufficient magnetic flux from said conductor to reverse the polarity of the magnet.

4. An electric current indicator comprising a current carrying coil, a movable member of magnetic material associated therewith, an indicator carried by the movable member, a permanent magnet mounted at a point remote from the coil, and attenuated pole pieces extending from the magnet into close proximity to the movable member and incapable of transmitting sufficient magnetic flux from the coil to reverse the polarity of the magnet.

5. An electric current indicator comprising a current carrying coil, a movable member of magnetic material positioned adjacent the coil, an indicator carried by the movable member, a permanent magnet mounted at a point remote from the coil, and metallic pole pieces of low magnetic retentiveness and small cross section, extending from the magnet into close proximity to the movable member and incapable of transmitting sufficient magnetic flux from the coil to reverse the polarity of the magnet.

6. An electric current indicator comprising a base, a magnetic member pivoted near one side thereof, a current carrying coil associated therewith, a permanent magnet mounted on the base at the side opposite to the magnetic member, and thin strips of magnetic material of small cross section extending from the poles of the permanent magnet into close proximity to the magnetic member and incapable of transmitting sufficient magnetic flux from the coil to reverse the polarity of the magnet.

7. An electric current indicator comprising a circular base, a magnetic member pivoted near one side thereof, a current carrying coil associated therewith, a short bar of permanently magnetized metal curved to conform to the curvature of the periphery of the base and mounted at the side opposite to the magnetic member, and thin strips of magnetic material of small cross section extending from the poles of the permanent magnet into close proximity to the magnetic member and incapable of transmitting sufficient magnetic flux from the coil to reverse the polarity of the magnet.

8. An electric current indicator comprising a movable magnetic member, an electrical conductor associated therewith, a permanent magnet, and flexible pole pieces extending from the poles of the magnet into close proximity to the magnetic member and incapable of transmitting sufficient magnetic flux from the coil to reverse the polarity of the magnet.

9. An electric current indicator comprising a current carrying member, a member susceptible to magnetic influence associated therewith, said members being relatively movable, a permanent magnet and flexible pole pieces extending from the poles of the magnet into close proximity to the members.

In testimony whereof I hereunto set my hand.

JOHN L. AXEN.